United States Patent [19]

Imai et al.

[11] Patent Number: 5,150,288
[45] Date of Patent: Sep. 22, 1992

[54] PRODUCTION MANAGEMENT SYSTEM AND METHOD OF TRANSMITTING DATA

[75] Inventors: Shinji Imai; Hiroshi Hamano; Michio Fujinuma; Chikafumi Shimanaka; Shinzo Urushidani, all of Sayama, Japan

[73] Assignee: Honda Giken Kogyo Kabushiki Kaisha, Tokyo, Japan

[21] Appl. No.: 451,304

[22] Filed: Dec. 15, 1989

[51] Int. Cl.$^5$ .............................................. G06F 15/46
[52] U.S. Cl. .................................. 364/132; 364/138; 364/468
[58] Field of Search ............... 364/132, 138, 140, 192, 364/468, 474.01, 474.11, 478

[56] References Cited

U.S. PATENT DOCUMENTS

| 4,564,913 | 1/1986 | Yomogida et al. | 364/468 |
|---|---|---|---|
| 4,698,766 | 10/1987 | Entwistle et al. | 364/468 |
| 4,803,613 | 2/1989 | Kametani et al. | 364/132 |
| 4,829,445 | 5/1989 | Burney | 364/478 |
| 4,833,592 | 5/1982 | Yamanaka | 364/138 |
| 4,833,624 | 5/1989 | Kuwahara et al. | 364/513 |
| 4,837,704 | 6/1989 | Lengefeld | 364/478 |
| 4,841,431 | 6/1989 | Takagi et al. | 364/187 |
| 4,891,765 | 1/1990 | Hatori et al. | 364/513 |
| 4,958,292 | 9/1990 | Kaneko et al. | 364/468 |
| 4,998,206 | 3/1991 | Jones et al. | 364/468 |

FOREIGN PATENT DOCUMENTS 0004905 10/1979 European Pat. Off. .

Primary Examiner—Jerry Smith
Assistant Examiner—Paul Gordon

[57] ABSTRACT

A production management system for controlling a production line such as an automobile assembling line includes a plurality of slave computers for controlling assembling robots in assembling stations, and a host computer for supervising common information required by the slave computers. When the common information is to be modified due to a change in the robots, the common iinformation stored in the host computer is modified into corrected common information, and the corrected common information is transmitted from the host computer to the slave computers. The common information stored in the slave computers can therefore be modified by the corrected common information.

3 Claims, 6 Drawing Sheets

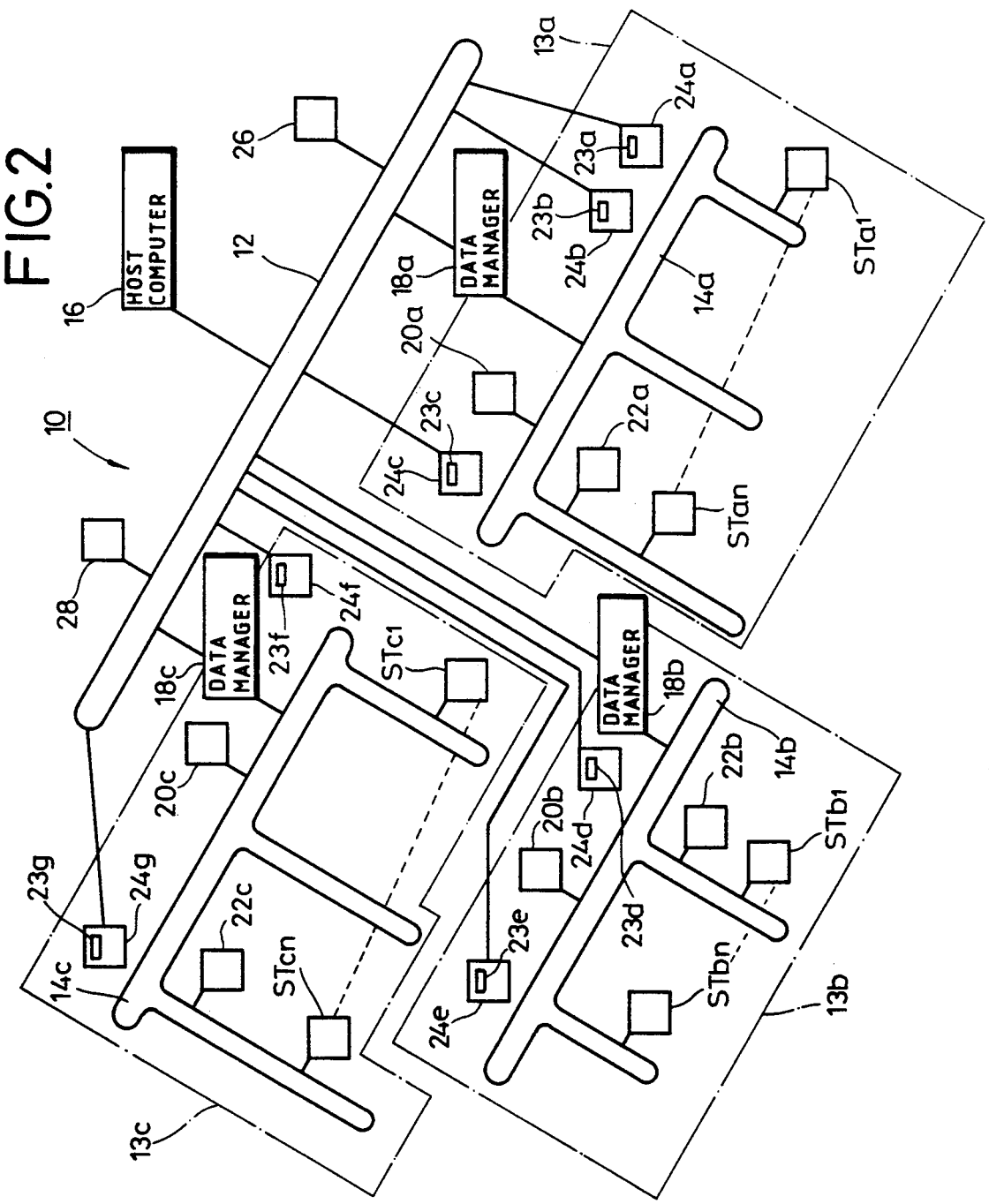

FIG.5

| TYPE DATA XE | OPERATION PATTERN DATA ZL |
|---|---|
| X1 | Z1 : 1 0 0 0 1 0 0 0 1 · · · · · · 1 0 1 0 |
| X2 | Z2 : 0 0 1 0 0 0 0 0 1 · · · · · · 0 0 1 0 |
| X3 | Z3 : 1 0 0 1 0 0 0 1 1 · · · · · · 0 1 0 1 |
| X4 | Z4 : 1 0 1 0 0 0 0 0 1 · · · · · · 1 0 1 0 |

| SERIAL NUMBER | TEXT | | | | | |
|---|---|---|---|---|---|---|
| | CARRIAGE NUMBER | | | | | |
| | TYPE DATA | | | | | |
| | ROBOT NUMBER | AXIS NUMBER | TIGHTENING TORQUE | TIGHTENING TIME | FRAME NUMBER | RESULT OF CHECK |
| A-1 | | | | | | |
| A-2 | | | | | | |
| A-3 | RBa$_1$ | 3 | 5.0 | 2 | F-12 | OK |
| A-4 | RBa$_1$ | 2 | 5.5 | 2 | F-12 | OK |
| A-5 | RBa$_1$ | 1 | 5.5 | 3 | F-12 | OK |
| A-6 | RBa$_2$ | 1 | 12.0 | 2 | F-11 | OK |
| A-7 | RBa$_2$ | 2 | 12.0 | 2 | F-11 | OK |
| A-8 | RBa$_2$ | 3 | 12.5 | 4 | F-10 | OK |
| A-9 | RBa$_2$ | 4 | 12.0 | 2 | F-10 | OK |
| A-10 | RBa$_3$ | 5 | 8.0 | 0 | F-10 | OK |

PRODUCTION MANAGEMENT SYSTEM AND METHOD OF TRANSMITTING DATA

BACKGROUND OF THE INVENTION

The present invention relates to a production management system and a method of transmitting data, for use with an automatic production line for manufacturing products such as automobiles, and more particularly to a production management system having a host computer for centralized management of common data required by slave computers which are associated with pieces of production equipment such as various robots of an automobile production line and control or manage these pieces of production equipment, and a method of transmitting data in the production management system.

As more useful electronic devices are developed in recent years, production lines for manufacturing various products are being automatized to improve the quality of the manufactured products. Modern production lines include a plurality of machining stations combined with numerically controlled machine tools and automatic machines such as robots. These machining stations are coupled with an automatic warehouse or a material handling system including self-propelled carriages so that various workpieces such as parts to be machined and assembled can be automatically supplied to the machining stations. Such a combined system is known as an FA (Factory Automation) system, which includes a production management computer that controls the machining and assembling operation in each of the machining stations and controls or manages the flow or distribution of workpieces between the machining stations. The FA system is also employed to control automobile assembling lines.

To meet diverse consumer needs, some automobile assembling lines today are each designed to assemble automobiles of many different kinds based on desired combinations of types, grades, geographical regions of use, and options. It is therefore necessary on an automobile assembling line to change automatic machines or actuators frequently in all or some of the machining stations depending on the type of automobiles to be produced. Usually, the pieces of production equipment such as automatic machines of the assembling line have multiple functions and are highly complex. In order to process data to be supplied to the automatic machines and quickly recover any of the automatic machines from malfunctioning conditions, the assembling line should be controlled by a centralized production management system which manages such data processing and recovery from failures under centralized control. Highly efficient, complex data processing for an assembling line controlled by a centralized production management system preferably requires production management computers to be associated with respective pieces of production equipment in the machining (or assembling) stations for managing these pieces of production equipment under decentralized control.

On a production line such as an automobile assembling line where pieces of production equipment and actuators need to be frequently changed, however, the production management computers of such a decentralized production management system need to be separately supplied with common information such as production equipment type information, actuator type information, and abnormal code information. When certain pieces of production equipment or certain actuators are changed or removed, therefore, corresponding common information must be modified, i.e., changed in or removed from the respective associated production management computers. As a result, the maintenance of the decentralized production management system is highly complicated.

Even if the pieces of production equipment on an automobile assembling line are not changed, operation pattern data for the automatic machines in the respective machining stations must be changed each time a different automobile type is to be assembled.

The process of changing operation pattern data for the respective automatic machines on an automobile assembling line depending on the type of automobiles to be manufactured is very tedious and time-consuming, resulting in an increase in the cost of production.

The production management computers of the decentralized system are governed by a host computer. Data should be reliably and quickly transmitted between the production management computers and also between these computers and the host computer for high-speed operation of the assembling line.

FIG. 1 of the accompanying drawings shows a text format for data, which has heretofore been employed in such data transmission. The text format, generally denoted at 2, comprises a heading 4 that contains auxiliary information such as a transmission route, priority, and a message number, required to process a text, a text 6 containing an information message, transmission characters SOH (start of heading), STX (start of text), and ETX (end of text), and a block check character BCC.

The transmission control characters SOH, STX, ETX are defined by JISC 6220, and have the following functions. The transmission control character SOH is a character for starting the heading 4 of the information message. The transmission control character STX is a character used at the end of the heading 4 and prior to the text 6. The transmission control character ETX is a character used at the end of the text 6. When a data item is transmitted from a transmitting end to a receiving end, the receiving end transmits an acknowledge signal each time one of the transmission control characters SOH, STX, ETX and the block check character BCC (hereinafter referred to as transmission control characters TCC) is received, while at the same time the receiving end receives the heading 4 and the text 6.

The data transmission system in which an acknowledge signal is transmitted from the receiving end to the transmitting end each time a transmission control character TCC is received is also employed in an automobile assembling line. More specifically, data supplied to a host computer includes for example, quality control data such as tightening torque data and tightening time data from a nut runner as an automatic machine, or operation end data. Based on the supplied data, the host computer displays such quality control data on a display unit. Workpieces assembled on an automobile assembling line having a plurality of machining stations are operated upon at a large number of locations. Therefore, a vast amount of data must be transmitted and received within a short period of time.

The conventional data transmission system employing the text format 2 shown in FIG. 1 requires the transmitting and receiving ends to confirm each of the transmission control characters TCC. The time needed to confirm the transmission control characters TCC is long, and hence the time required to transmit desired data is also long. The long data transmission time tends to affect the processing time of the assembling line.

SUMMARY OF THE INVENTION

It is a major object of the present invention to provide a production management system including slave computers for controlling pieces of production equipment in respective working or machining stations and a host computer for controlling the slave computers, the production management system being capable of efficiently and flexibly coping with changes of the pieces of production equipment or the types of workpieces, and of transmitting data quickly and accurately between the computers, and also to provide a method of transmitting data in such a production management system.

Another object of the present invention is to provide a production management system for controlling a production line having a plurality of working stations, comprising a slave computer for controlling pieces of production equipment in the working stations, and a host computer for supervising common information required by the slave computer, the arrangement being such that when the common information is to be modified due to a change in the pieces of production equipment, the common information stored in the host computer is modified into corrected common information, and the corrected common information is transmitted from the host computer to the slave computer, so that the common information stored in the slave computer can be modified by the corrected common information.

Still another object of the present invention is to provide the production management system further including a main network by which the host computer and the slave computer are interconnected, and a subnetwork by which the slave computer and the pieces of production equipment are interconnected.

Yet another object of the present invention is to provide the production management system wherein each of the pieces of production equipment includes a sequencer and/or a robot controller, and an automatic machine controllable by the sequencer and/or the robot controller.

A further object of the present invention is to provide a production management system for controlling a production line having a plurality of working stations having respective automatic machines controllable by sequencers and/or robot controllers, comprising read-out means for reading type data applied to workpieces delivered to the production line, and computer means having memories for storing type data and operation pattern data composed of bit trains, the arrangement being such that when a workpiece is delivered to the production line, the type data of the delivered workpiece are read by the read-out means and transmitted to the computer means, and the computer means transmits operation pattern data corresponding to the transmitted type data to the sequencers and/or the robot controllers for controlling the automatic machines.

A still further object of the present invention is to provide the production management system wherein the computer means comprises a plurality of slave computers for controlling the sequencers and/or robot controllers, and a host computer for controlling the slave computers, the arrangement being such that the type data read by the readout means are transmitted through the host computer to the slave computers, and the slave computers select operation pattern data corresponding to the transmitted type data.

It is also an object of the present invention to provide a method of transmitting data for a production line including a host computer, a slave computer controllable by the host computer, and pieces of production equipment controllable by the slave computer, comprising the steps of adding consecutive serial numbers to respective data in the slave computer when the data are transmitted from the host computer through the slave computer to the pieces of production equipment or when the data are transmitted from the pieces of production equipment through the slave computer to the host computer, and storing the data with the serial numbers added thereto in the slave computer and transmitting the data with the serial numbers added thereto to the pieces of production equipment or the host computer.

Another object of the present invention is to provide the method further comprising the steps of, after the data have been stored and transmitted, determining whether a serial number is missing among the serial numbers added to the data received by the pieces of production equipment or the host computer, and, if there is a missing serial number, requesting the slave computer to transmit the data relative to the missing serial number.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a schematic view of a production line in which a production management system according to the present invention is incorporated;

FIG. 5 is a diagram of an operation pattern table stored in data managers of the production line;

FIG. 6 is a diagram showing operation pattern data in the operation pattern table illustrated in FIG. 5;

FIG. 7 is a diagram of data transmitted and received by the data managers of the production line shown in FIGS. 2 and 3.

DETAILED DESCRIPTION OF THE PREFERRED EMBODIMENT

Figure 1:
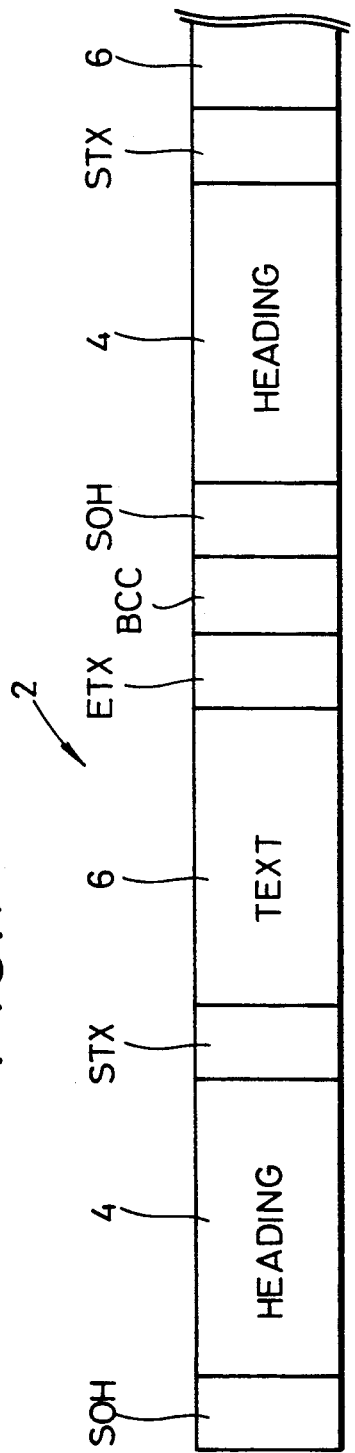
FIG. 1 is a diagram of a text format used in a conventional method of transmitting data.

FIG. 2 schematically shows a production line incorporating a production management system according to the present invention. In the illustrated embodiment, the production line is shown as an automobile assembling line by way of example.

The production line, generally designated by the reference numeral 10, includes a main network 12 having optical fiber cables or the like, and subnetworks 14a through 14c associated respectively with a plurality of separate assembly lines 13a through 13c. To the main network 12, there is a connected a host computer 16 for controlling or managing the production on the production line 10. Slave computers (hereinafter referred to as "data managers") 18a through 18c are connected between the main network 12 and the subnetworks 14a through 14c for transmitting and receiving data therebetween. The data managers 18a through 18c receive data, add predetermined serial numbers to all the received data, and transmit the data with the serial numbers, and have respective memories (not shown) for storing all the data with the serial numbers which are transmitted.

Self-propelled carriages run along the assembly lines 13a through 13c. The subnetworks 14a through 14c are associated with machining (or assembling) stations STa1 through STan, STb1 through STbn, and STc1 through STcn (hereinafter referred to as "machining stations STa1 through STcn"), respectively. The subnetworks 14a through 14c are also associated with respective control panels (hereinafter referred to as "overall control panels") 20a through 20c in the form of sequencers for supervising the positions and speeds of the self-propelled carriages and controlled actions to be carried out in the respective machining stations STa1 through STcn under centralized control. To the subnetworks 14a through 14c, there are also connected respective sequencers (hereinafter referred to as "block control panels") 22a through 22c for distributing control information to various pieces of production equipment in the respective machining stations STa1 through STcn depending on the travel of the self-propelled carriages, i.e., in synchronism with the introduction of workpieces.

Figure 3:
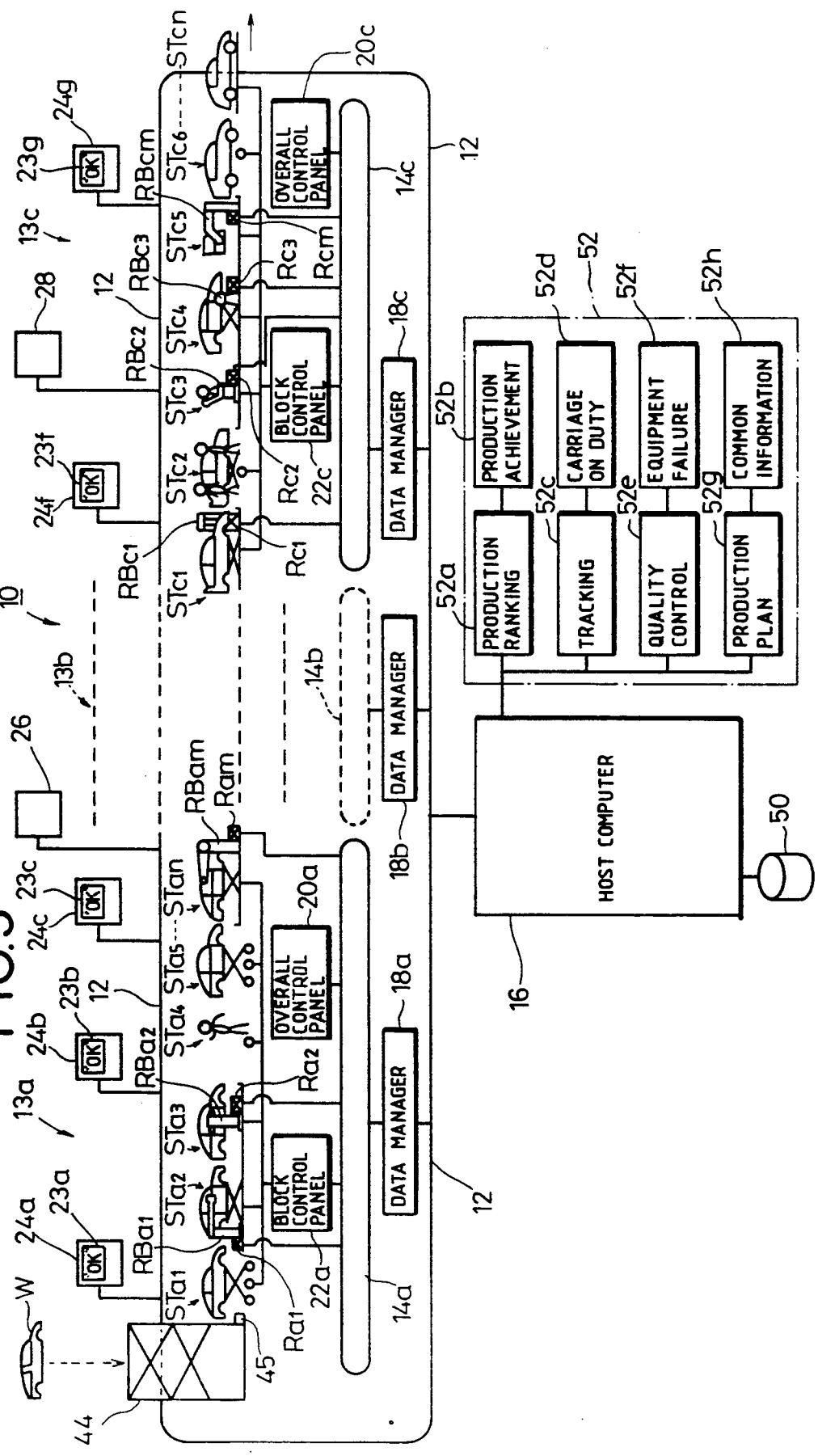
FIG. 3 is a detailed view of the production line shown in FIG. 2.

The pieces of production equipment referred to above include the overall control panels 20a through 20c, the block control panels 22a through 22c, robot controllers Ra1 through Ram, Rb1 through Rbm, Rc1 through Rcm (hereinafter referred to as "robot controllers Ra1 through Rcm"), and robots RBa1 through RBam, RBb1 through RBbm, RBc1 through RBcm (hereinafter referred to as "robots RBa1 through RBcm"), as shown in FIG. 3.

The assembly lines 13a through 13c are combined with line side computers 24a through 24g arranged along the assembly lines 13a through 13c and having respective display units 23a through 23g. The line side computers 24a through 24g are used as quality monitors or type checking monitors for monitoring how workpieces are assembled in the machining stations STa1 through STcn. The line side computers 24a through 24g are connected directly to the main network 12. The main network 12 is connected to supervising computers 26, 28 serving as supervising monitors for monitoring the degree to which the assembly lines 13a through 13c operate on duty and the total number of automobiles assembled.

The production line incorporating the production management system of the invention is basically constructed as described above. Operation and advantages of the production line and the production management system will be described below.

Figure 4:
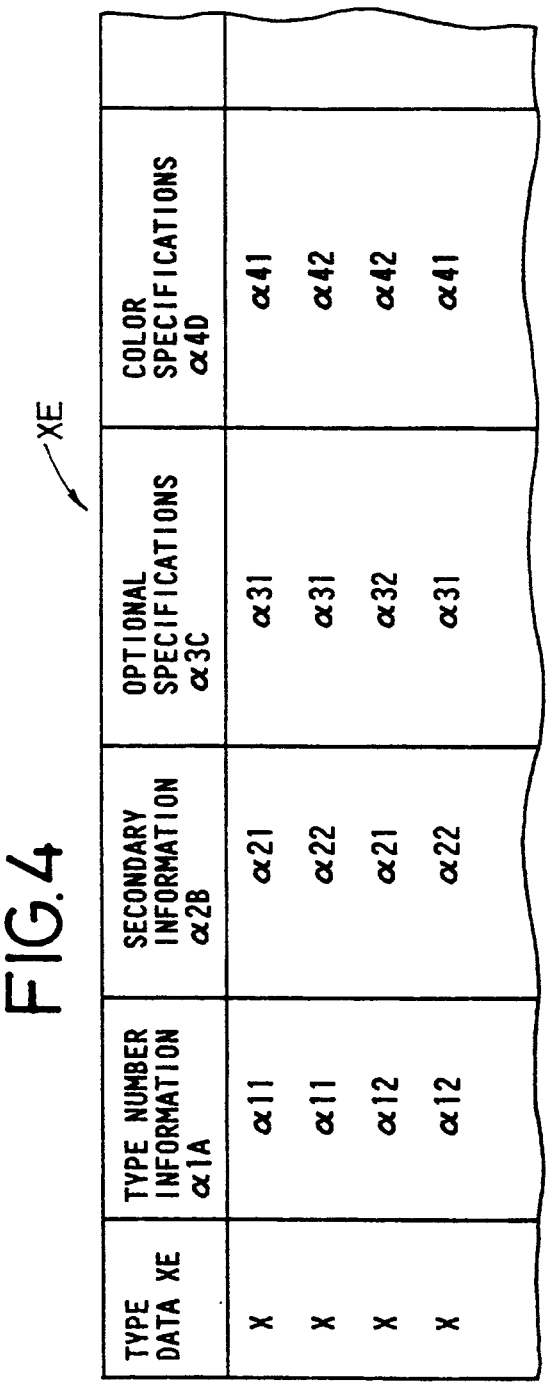
FIG. 4 is a diagram showing type data corresponding to workpieces delivered to the production line.

FIG. 3 shows in detail the production line 10 shown in FIG. 2. As illustrated in FIG. 3, the host computer 16 is associated with a type data file 50 for storing type data corresponding to workpieces W to be delivered onto the production line 10. The workpieces W (i.e., automobile bodies in the illustrated embodiment) have labels printed with bar codes indicative of type number information $a1A$ ($A=1, 2$, of the workpieces W. When a workpiece W is delivered from a drop lifter 44 into the first machining station STa1 of the production line 10, the type number information $a1A$ on the label is read by an input device 45 such as a bar code reader and applied therefrom to the host computer 16 through the main network 12. In response to the applied type number information $a1A$, the host computer 16 reads, from the data file 50, type data XE ($E=1, 2, \ldots$) corresponding to the type number information $a1A$ and composed of secondary information $a2B$ ($B=1, 2, \ldots$) such as of a type grade, a geographical region of use, etc., optional specifications $a3C$ ($C=1, 2 \ldots$) such as a power steering function, a sun roof specification, etc., and color specifications $a4D$ ($D=1, 2, \ldots$) of automobiles, as shown in FIG. 4. The host computer 16 then sends the type data XE through the main network 12 to the line side computer 24a which stores the supplied type data XE.

The host computer 16 is also associated with a group 52 of production management tables 52a through 52h. These production management tables 52a through 52g store production ranking data, production achievement data, tracking data, self-propelled carriage on-duty data, quality control data, equipment failure data, and production plan data, respectively. The production management table 52h stores common information indicative of the arrangements of the assembly lines 13a through 13c corresponding to the subnetworks 14a through 14c, the arrangements of the pieces of production equipment such as automatic machines installed in the machining stations STa1 through STcn, operation pattern information of the pieces of production equipment, and the types of actuators used. The tracking data referred to above are data for controlling the self-propelled carriages based on the self-propelled carriage on-duty data so that they will smoothly run on the assembly lines 13a through 13c without a collision. The tracking data are delivered to the overall control panels 20a through 20c.

The common information stored in the production management table 52h is supplied from the host computer 16 through the main network 12 to the data managers 18a through 18c which then stores the received data in their memories.

One form of such common information stored in the memory of each of the data managers 18a through 18c is an operation pattern table YM ($M=1, 2, \ldots$) for operating the robots RGBa1 through RBcm. FIG. 5 shows the operation pattern table YM in detail. As shown in FIG. 5, the operation pattern table YM is composed of the type data XE and operation pattern data ZL ($L=1, 2, \ldots$). The operation pattern data ZL are in the form of 64-bit data comprising four series of 16-bit data, as shown in FIG. 6. The 16-bit data DP ($P=1, 2, \ldots$) of the operation pattern data ZL are assigned to the robot controllers Ra1 through Rcm, which then read only those 16-bit data DP corresponding thereto and actuate the robots RBa1 through RBcm based on the data thus read.

The bits of which the operation pattern data ZL are composed are representative of optional specifications such as a power steering, a sun roof, an automatic transmission, etc., geographical region specifications including domestic, U.S.A., and Europe specifications, and performance specifications such as engine displacements, radiator capacities, etc.

The common information including the operation pattern data ZL is supplied through the data managers 18a through 18c and the subnetworks 14a through 14c to the overall control panels 20a through 20c and the block control panels 22a through 22c in which the common information is stored, and also supplied through the main network 12 to the supervising computers 26, 28 in which the common information is stored. The common information is also stored in the data managers 18a through 18c.

When the common information is to be modified, i.e., changed or removed due to a change in the arrangement of the assembly lines resulting from different type grades, geographical regions, and options of automobiles assembled on the production line 10, or due to modification or removal of the pieces of assembling equipment and their operation pattern information, or due to a change in the types of the actuators used, only the common information stored in the management table 52h associated with the host computer 16 is changed, added, or deleted, and the corrected common information is then supplied through the main network 12, the data managers 18a through 18c, and the subnetworks 14a through 14c to the control panels 20a through 20c, 22a through 22c, and the computers 26, 28. Accordingly, the common information can be modified with ease.

After the common information has been prepared, a workpiece W supplied from the drop lifter 44 is placed on a self-propelled carriage which is then moved to carry the workpiece W to the first machining station STal. Upon arrival of the workpiece W at the first machining station STal, the identification data indicating the carriage number are read from the self-propelled carriage which carries the workpiece W, and sent to the overall control panel 20a which stores the received identification data. The text composed of the identification data indicative of the carriage number is transmitted as data 100 from the overall control panel 20a through the subnetwork 14a, the data manager 18a, and the main network 12 to the line side computer 24a. At this time, a serial number A-1 is added to the text by the data manager 18a before the data 100 are transmitted to the line side computer 24a. The transmitted data 100 with the serial number A-1 added are also stored in the memory of the data manager 18a.

Upon reception of the transmitted data 100 with the serial number A-1 added thereto, the line side computer 24a checks the received data 100 up with carriage identification data which have previously been transmitted from the host computer 16 and stored in the line side computer 24a. If the data 100 agrees with the stored carriage identification data, then the line side computer 24a transmits an agreement signal to the host computer 16. In response to the agreement signal, the host computer 16 supplies the type data XE corresponding to the workpiece W carried on the carriage having the above carriage number, e.g., the type data X1 (see FIG. 5), through the main network 12 to the data manager 18a. The data manager 18a then refers to the operation pattern table YM stored in the memory thereof, and transmits the operation pattern data ZL=Z1 corresponding to the type data XE=X1 to the overall control panel 20a and the block control panel 22a. The type data X1 include a frame number (body number) for identifying the workpiece W, i.e., the automobile. The data manager 18a adds a serial number A-2 to the type data X1, transmits the type data X1 with the serial number A-2 as data 100 to the overall control panel 20, and stores the data 100 in its memory (see FIG. 7).

The overall control panel 20a has as many storage areas as the number of the machining stations STal through STcn. The first storage area of the overall control panel 20a stores the carriage number and the type data XE as a data pair. This data pair is transferred successively through the second storage area, the third storage area, and so on in synchronism with the movement of the self-propelled carriage. The type data XE transmitted to the block control panel 22a are supplied to the robot controllers Ral through Ram associated with the respective robots RBal through RBam in the machining stations STal through STan.

The robot controllers Ral through Ram select an operation pattern program corresponding to the type of the workpiece W and prepared according to the 16-bit data DP (see FIG. 5) of their own among the operation pattern data ZL=Z1 from the block control panel 22a, and control the robots RBal through RBam, respectively, to perform work assigned to the respective machining stations STal through STan. Then, the block control panel 22a sends operating condition signals in the processing time from the robot controllers Ral through Ram through the data manager 18a of the subnetwork 14 and the main network 12 to the host computer 16. Each of the operating condition signals has a text which, as shown in FIG. 7, includes the reference mark relative to the robot RBal, for example, which is a nut runner, the axis number of the robot RBal, for example, the tightening torque value, the tightening time, the frame number given to the workpiece W, and data indicative of whether the nut is tightened properly ("OK") or improperly ("NG"). At this time, serial numbers A-3 through A-10 are added to the operating condition signals, respectively, by the data manager 18a before the signals are sent as data 100 to the host computer 16.

The host computer 16 determines whether the serial numbers A-3 through A-10 in the transmitted data 100 are consecutive or not. If any serial number is missing, then the host computer 16 requests the data manager 18a to transmit the data 100 relative to the missing serial number, so that the host computer 16 can obtain the complete data 10 relative to the missing serial number which is stored in the data manager 18a. The data 100 relative to the serial numbers A-3 through A-10 are quality control data which are recorded in the management table 52e in the table group 52 (FIG. 3).

When the block control panel 22a receives operation completion signals from the robot controllers Ral through Ram, these signals are sent to the overall control panel 20a. The overall control panel 20a controls all carriages running on the assembly line 13a corresponding to the subnetwork 14a, and also carriages moving between the machining stations at all times. The overall control panel 20a transmits movement permit signals to self-propelled carriages through the block control panel 22a.

The above operation is repeated to move the self-propelled carriages and distribute the type data XE to the machining stations STal through STan. The robots RBla through RBam disposed in the respective machining stations STal through STan effect given operations according to the operation pattern data ZL corresponding to the type data XE.

The assembly lines 13b, 13c corresponding to the respective subnetworks 14b, 14c are of the same construction as that of the assembly line 13a of the subnetwork 14a. The functions of the overall control panels 20b, 20c and the block control panels 22b, 22c are also the same as those of the overall control panel 20a and the block control panel 22a. The data managers 18b, 18c are structurally and functionally identical to the data manager 18a. More specifically, the data managers 18b, 18c add serial numbers to the data to be transmitted and received, and store the data with the serial numbers in their respective memories. The serial numbers to be added by the data managers 18b, 18c are different from those to be added by the data manager 18c, e.g., they are B-1, B-2, . . . and C-1, C-2, . . ., respectively, so that the networks from which these data have been transmitted can be identified. The serial numbers are however not limited to the above numbers, but may have initial values of 1, 10001, 20001 to be added by the data managers 18a through 18c, respectively.

The serial numbers may be added such that they are successively added from the first serial number in either every working day, or every week if involved data are few.

Figure 8:
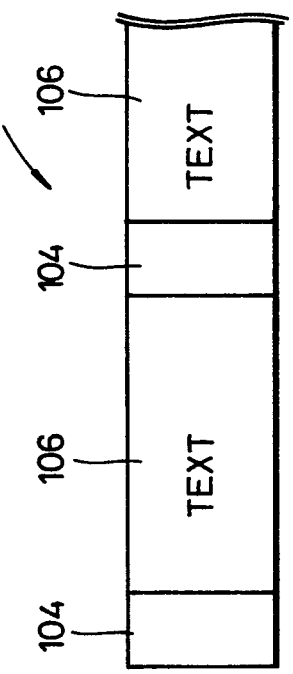
FIG. 8 is a diagram showing a text format used in a data transmission method according to the present invention.

According to the data transmission method of the present invention, as shown in FIG. 8, a text format 102 is composed of only an inherent serial number area 102 and a text 106. Therefore, the text format 102 is much simpler than the conventional text format 2 shown in FIG. 1.

In the illustrated embodiment, automobile bodies subnetwork 14a, suspensions are assembled on the assembly line 13b corresponding to the subnetwork 14b, and engines are assembled on the assembly line 13c corresponding to the subnetwork 14c. However, the assembly lines 13a through 13c may be employed to assemble automobile parts in different combinations.

With the present invention, as described above, the production management system comprises data managers or slave computers for controlling pieces of production equipment in the respective machining stations and a host computer for supervising common information required by the slave computers. When the common information is to be modified or removed due to a change in the pieces of production equipment, only the common information stored in the host computer is modified or removed so that the common information stored in each of the slave computers can be modified or removed. Therefore, the data can easily be modified or removed and any process for confirming such data modification or removal can easily be performed. The time required to effect the maintenance of the production management system can thus be shortened. As a consequence, the production management system of the present invention has the advantages of both a decentralized control system having a plurality of slave computers and a centralized control system having a host computer. Since the production management system of the invention can easily modify or remove data to be stored in the slave computers depending on the types of products to be produced, the production management system is particularly useful in combination with the production mode in which products of many kinds are manufactured on one production line.

Moreover, the automatic machining or assembling devices such as robots are controlled by the operation pattern data composed of bit trains that are shared by these automatic machining or assembling devices. When workpieces or products of different specifications are to be machined or assembled by the automatic machining or assembling devices, the bit trains or data of the operation pattern data are changed thereby changing the operation of the automatic machining or assembling devices. The time required to change the data for the automatic machining or assembling devices is thus greatly shortened. Where the production management system is used in combination with a production line for producing many different kinds of products, the cost of the products manufactured by the production line can be lowered.

Accordingly, the production management system of the invention is useful in combination with the production mode in which products of many kinds are manufactured on one production line.

Furthermore, the data managers or slave computers having memories are connected between the pieces of production equipment in the machining or working stations and the host computer. Data is transmitted between the pieces of production equipment and the host computer according a text format in which inherent serial numbers are added to the data by the data managers. Therefore, the response time required to confirm the data is reduced. Consequently, the data can be transmitted at high speed.

Although a certain preferred embodiment has been shown and described, it should be understood that many changes and modifications may be made therein without departing from the scope of the appended claims.

What is claimed is:

1. A production management system for controlling a production line having a plurality of working stations having respective automatic machines controllable by at least one of sequencers and robot controllers, comprising:

a plurality of pieces of production equipment, each of said pieces of production equipment including at least one of a sequencer and a robot controller, and an automatic machine controllable by said at least one of said sequencer and said robot controller;

read-out means for reading type data applied to workpieces delivered to the production line;

computer means having memories for storing type data and operation pattern data composed of bit trains, said computer means comprising a plurality of slave computers for controlling said at least one of sequencers and robot controllers, and a host computer for controlling said slave computers and supervising common information required by said slave computers, wherein said type data read by said read-out means are transmitted through said host computer to said slave computers, and said slave computers select operation pattern data corresponding to the transmitted type data;

a main network by which said host computer and said plurality of slave computers are interconnected;

a plurality of subnetworks by which said slave computers and said at least one of sequencers and robot controllers are interconnected; and the system being such that when a workpiece is delivered to the production line, the type data of the delivered workpiece are read by said read-out means and transmitted to said computer means, and said computer means transmits operation pattern data corresponding to the transmitted type data to said at least one of sequencers and robot controllers for controlling the automatic machine, and when said common information is to be modified due to a change in said pieces of production equipment, the common information stored in said host computer is modified into corrected common information, and the corrected common information is transmitted from said host computer to said plurality of slave computers, so that the common information stored in said slave computers can be modified by said corrected information.

2. A method of transmitting data for a production line including a host computer, a slave computer controllable by said host computer, and pieces of production equipment controllable by said slave computer, comprising the steps of:

putting consecutive serial numbers with respective data in the slave computer when the data are transmitted from the host computer through the slave computer to the pieces of production equipment or when the data are transmitted from the pieces of production equipment through the slave computer to the host computer; and storing the data with the serial numbers in the slave computer and transmitting the data with the serial numbers to the pieces of production equipment or the host computer.

3. The method according to claim 2, further comprising the steps of:

after the data have been stored and transmitted, determining whether a serial number is missing among the serial numbers with the data received by the pieces of production equipment or the host computer; and if there is a missing serial number, requesting the slave computer to transmit the data relative to the missing serial number.

* * * * *